(12) United States Patent
Parsons et al.

(10) Patent No.: US 12,055,842 B1
(45) Date of Patent: Aug. 6, 2024

(54) COLD-WEATHER RESILIENCE COVER FOR ELECTRONICS ASSEMBLY

(71) Applicant: GREATEST GENERATION, LLC, Orlando, FL (US)

(72) Inventors: Robert Wagner Parsons, Orlando, FL (US); Lauren Emma Parsons, Orlando, FL (US)

(73) Assignee: Greatest Generation, LLC, Orlando, FL (US)

( * ) Notice: Subject to any disclaimer, the term of this patent is extended or adjusted under 35 U.S.C. 154(b) by 0 days.

(21) Appl. No.: 18/427,439

(22) Filed: Jan. 30, 2024

(51) Int. Cl.
G03B 17/55 (2021.01)
G03B 17/02 (2021.01)
G03B 17/56 (2021.01)

(52) U.S. Cl.
CPC .......... G03B 17/55 (2013.01); G03B 17/02 (2013.01); G03B 17/561 (2013.01)

(58) Field of Classification Search
CPC ...... G03B 17/55; G03B 17/56; G03B 17/561; G03B 17/563; G03B 17/566; G03B 17/02; F16M 13/02; F16M 13/022; F16M 13/04

See application file for complete search history.

(56) References Cited

U.S. PATENT DOCUMENTS

| | | | |
|---|---|---|---|
| 1,065,898 A | 6/1913 | Goerdes | |
| 1,467,556 A | 9/1923 | Nagel | |
| 7,609,512 B2 | 10/2009 | Richardson et al. | |
| 8,727,642 B1 | 5/2014 | Tse et al. | |
| 8,992,102 B1 | 3/2015 | Samuels et al. | |
| 9,304,377 B2 | 4/2016 | Eineren et al. | |
| 9,618,828 B2 | 4/2017 | Lang et al. | |
| 9,628,681 B2 | 4/2017 | Clearman et al. | |
| 10,416,538 B2 | 9/2019 | Clearman | |
| D975,767 S | 1/2023 | Jiang | |
| 2003/0217940 A1 | 11/2003 | Russell et al. | |
| 2009/0009945 A1 | 1/2009 | Johnson et al. | |
| 2010/0060747 A1 | 3/2010 | Woodman | |
| 2012/0074005 A1 | 3/2012 | Johnson et al. | |
| 2017/0078537 A1 | 3/2017 | Peddecord et al. | |
| 2017/0339319 A1 | 11/2017 | Woodman et al. | |
| 2018/0352927 A1 | 12/2018 | Wang | |
| 2020/0139934 A1* | 5/2020 | Hein | H05B 3/84 |
| 2020/0159091 A1 | 5/2020 | Vitale et al. | |
| 2020/0364021 A1 | 11/2020 | Park et al. | |
| 2021/0021738 A1 | 1/2021 | Thomas et al. | |
| 2023/0176453 A1 | 6/2023 | Ali | |

FOREIGN PATENT DOCUMENTS

KR 20080028390 A 1/2010

* cited by examiner

Primary Examiner — Clayton E. LaBalle
Assistant Examiner — Fang-Chi Chang
(74) Attorney, Agent, or Firm — Stephen B. Katsaros; Patent Engineering, LLC

(57) ABSTRACT

The present disclosure discloses a cold-weather resilient case. The cold-weather resilient case employs a heating mechanism thereby effectively maintaining an optimal operating temperature for the camera even in the face of cold winter conditions. The cold-weather resilient case may include a cover and a carrier plate. The cover may be configured to envelop or encompass the electronics assembly. The carrier plate may be configured to hold an exothermic component which may further contact the electronics assembly in various configurations and may be further configured to heat the electronics assembly.

27 Claims, 16 Drawing Sheets

COLD-WEATHER RESILIENCE COVER FOR ELECTRONICS ASSEMBLY

TECHNICAL FIELD

This disclosure pertains, but not by way of limitation, to weather-resilient cover for electronics assembly that discharge rapidly when exposed to cold winter conditions.

BACKGROUND

Electronics assemblies, for example, image and/or video-capturing equipment like GoPro™ cameras, rely on lithium-ion batteries for power. However, using lithium-ion batteries in such devices carries specific drawbacks when used in frigid winter conditions. Low temperatures have a pronounced impact on lithium-ion batteries' capacity and overall performance, resulting in rapid discharging when the cameras are inactive or powered off. This decline in the overall battery performance curtails the operational duration of the cameras.

SUMMARY

To this end, a cold-weather resilient case is disclosed. The cold-weather resilient case employs a heating mechanism thereby effectively maintaining an optimal operating temperature for the camera even in cold winter conditions. In the simplest form, the cold-weather resilient case may include a cover and a carrier plate. The cover may be configured to envelop or encompass the electronics assembly. The carrier plate may be configured to hold an exothermic component, which may further contact the electronics assembly in various configurations and may be further configured to heat the electronics assembly. Therefore, it may be ensured that the camera's performance remains unhindered, preventing rapid discharging and allowing users to capture their actions and adventure moments without disruption, irrespective of the ambient temperature. While specific examples, configurations, and/or applications of the present cold-weather resilient case are provided, it is to be understood that granted claims define the breadth and depth of the present disclosure. The following example(s) on cold-weather resilient case illustrates the present cold-weather resilient case.

In an illustrative configuration of the present disclosure, the cold-weather resilience case for an electronics assembly with a user interface may include a cover configured to envelop the electronics assembly. The cover may include a frame body. The frame body may further include a first section, a second section oppositely disposed to the first section, a third section disposed between the first section and the second section, and a fourth section oppositely disposed to the third section. The cold-weather resilience case may further include a carrier plate, which may be hingedly attached to the fourth section. The carrier plate may include a carrier base onto which an exothermic component may be held. Further, the cold-weather resilience case may include an interface-load configuration. In the interface-load condition, the user interface of the electronics assembly is accessible, and the exothermic component is readily loadable to the carrier plate. The cold-weather resilience case may include a recording configuration different than the interface-load configuration. In the recording configuration, the exothermic component is in contact with the electronics assembly at the fourth section and configured to heat the electronics assembly.

In an illustrative configuration of the present disclosure, a heating method for heating an electronics assembly including a user interface in a cold-weather resilience case is disclosed. In the first step, the heating method may include providing a cover. The cover may include a frame body. The frame body may further include a first section, a second section oppositely disposed to the first section, a third section disposed between the first section and the second section, and a fourth section oppositely disposed to the third section. In the next step, the heating method may include providing a carrier plate which may be hingedly attached to the fourth section. The carrier plate may include a carrier base, and at least one bracket protruding from the carrier base. In the next step, the heating method may include attaching an exothermic component with the carrier plate using the at least one bracket. In the next step, the heating method may include transitioning the carrier plate between an interface-load configuration and a recording configuration. In the interface-load condition, the user interface of the electronics assembly is accessible, and the exothermic component is readily loadable to the carrier plate. The cold-weather resilience case may include a recording configuration different than the interface-load configuration. In the recording configuration, the exothermic component is in contact with the electronics assembly at the fourth section and configured to heat the electronics assembly.

In an illustrative configuration of the present disclosure, an electronics system may include an electronics assembly provided with a user interface. The electronics system may further include a cover configured to envelop the electronics assembly. The cover may include a frame body. The frame body may further include a first section, a second section oppositely disposed to the first section, a third section disposed between the first section and the second section, and a fourth section oppositely disposed to the third section. The electronics system may further include a carrier plate which may be hingedly attached to the fourth section, The carrier plate may include a carrier base, and at least one bracket protruding from the carrier base. The at least one bracket may be configured to hold an exothermic component. Further, the cold-weather resilience case may include an interface-load configuration. In the interface-load condition, the user interface of the electronics assembly is accessible, and the exothermic component is readily loadable to the carrier plate. The electronics system may include a recording configuration different than the interface-load configuration. In the recording configuration, the exothermic component is in contact with the electronics assembly at the fourth section and configured to heat the electronics assembly.

In an illustrative configuration of the present disclosure, the cold-weather resilience case for an electronics assembly with a user interface may include a cover configured to envelop the electronics assembly. The cover may include a frame body. The frame body may further include a first section, a second section oppositely disposed to the first section, a third section disposed between the first section and the second section, and a fourth section oppositely disposed to the third section. Further, to the fourth section, an omniphobic sheet may be disposed, and configured to stick to the user interface. The cold-weather resilience case may further include a carrier plate which may be hingedly attached to the fourth section, The carrier plate may include a carrier base, and at least one bracket protruding from the carrier base. The at least one bracket may be configured to hold an exothermic component. Further, the cold-weather resilience case may include an interface-load configuration. In the interface-load condition, the user interface of the electronics assembly is accessible, and the exothermic component is readily loadable to the carrier plate. The cold-weather resilience case may include a recording configuration different than the interface-load configuration. In the recording configuration, the exothermic component is in contact with the electronics assembly at the fourth section and configured to heat the electronics assembly.

In an illustrative configuration of the present disclosure, the cold-weather resilience case for an electronics assembly with a user interface may include a cover configured to envelop the electronics assembly. The cover may include a frame body. The frame body may further include a first section, a second section oppositely disposed to the first section, a third section disposed between the first section and the second section, and a fourth section oppositely disposed to the third section. The cold-weather resilience case may further include a carrier plate which may be hingedly attached to the fourth section, The carrier plate may include a carrier base, a perimeter surrounding the carrier base, at least one bracket configured to hold an exothermic component, and a rim disposed on the perimeter to confine the exothermic component on the carrier base. Further, the cold-weather resilience case may include an interface-load configuration. In the interface-load condition, the user interface of the electronics assembly is accessible, and the exothermic component is readily loadable to the carrier plate. The cold-weather resilience case may include a recording configuration different than the interface-load configuration. In the recording configuration, the exothermic component is in contact with the electronics assembly at the fourth section and configured to heat the electronics assembly.

In an illustrative configuration of the present disclosure, the cold-weather resilience case for an electronics assembly with a user interface may include a cover configured to envelop the electronics assembly. The cover may include a frame body. The frame body may further include a first section, a second section oppositely disposed to the first section, a third section disposed between the first section and the second section, and a fourth section oppositely disposed to the third section. The frame body may further include at least one first-type coupler disposed on the second section. The cold-weather resilience case may further include a carrier plate which may be hingedly attached to the fourth section, The carrier plate may include a carrier base, and at least one bracket protruding from the carrier base. The carrier plate may further include at least one strap extending from the carrier base corresponding to the at least one first-type coupler. The at least one strap may further include at least one second-type coupler. The at least one bracket may be configured to hold an exothermic component. Further, the cold-weather resilience case may include an interface-load configuration. In the interface-load condition, the user interface of the electronics assembly is accessible, and the exothermic component is readily loadable to the carrier plate. The cold-weather resilience case may include a recording configuration different than the interface-load configuration. In the recording configuration, the exothermic component is in contact with the electronics assembly at the fourth section and configured to heat the electronics assembly, and the first-type coupler may engage the second-type coupler to lock the carrier plate to the cover.

Further areas of applicability of the present disclosure will become apparent from the detailed description provided hereinafter. It should be understood that the detailed description and specific examples while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or similar parts. While examples and features of disclosed principles are described herein, modifications, adaptations and other implementations are possible without departing from the spirit and scope of the disclosed configurations. It is intended that the following detailed description be considered exemplary only, with the true scope and spirit being indicated by the following claims.

Electronics assembly, or electronics assembly such as image capturing devices, or video capturing devices, for example, GoPro™ cameras may use lithium-ion batteries as a power source. Under typical use, the average runtime of the batteries lasts between 60-90 minutes with continuous usage in accordance with a single resolution setting. However, when the batteries are exposed to cold temperatures, especially during winter conditions, the capacity and overall performance of the said batteries tend to decrease. When the device is inactive or due to the absence of any heat source for the device, the batteries may discharge rapidly. Furthermore, exposure to cold temperatures can lead to temporary voltage drop in the battery resulting in unexpected shutdowns or difficulties in powering the device.

To this end, illustrative configurations of a cold-weather resilient case are disclosed. The cold-weather resilient case is applicable for enclosing and heating the electronics assembly to protect the batteries from cold temperatures, especially when the electronics assembly is inactive. Furthermore, during travel or motion in cold temperatures, the electronics assembly may be enclosed in the cold-weather resilient case to protect the batteries from the cold weather conditions. Particularly, the cold-weather resilient case may accommodate an exothermic component that may contact the electronics assembly. Particularly, the exothermic component may contact the electronics assembly. As may be appreciated, heat generated by the exothermic component is intended to warm the electronics assembly, thereby keeping the batteries, or the power source warm against the cold temperatures of the surroundings.

Figure 1:
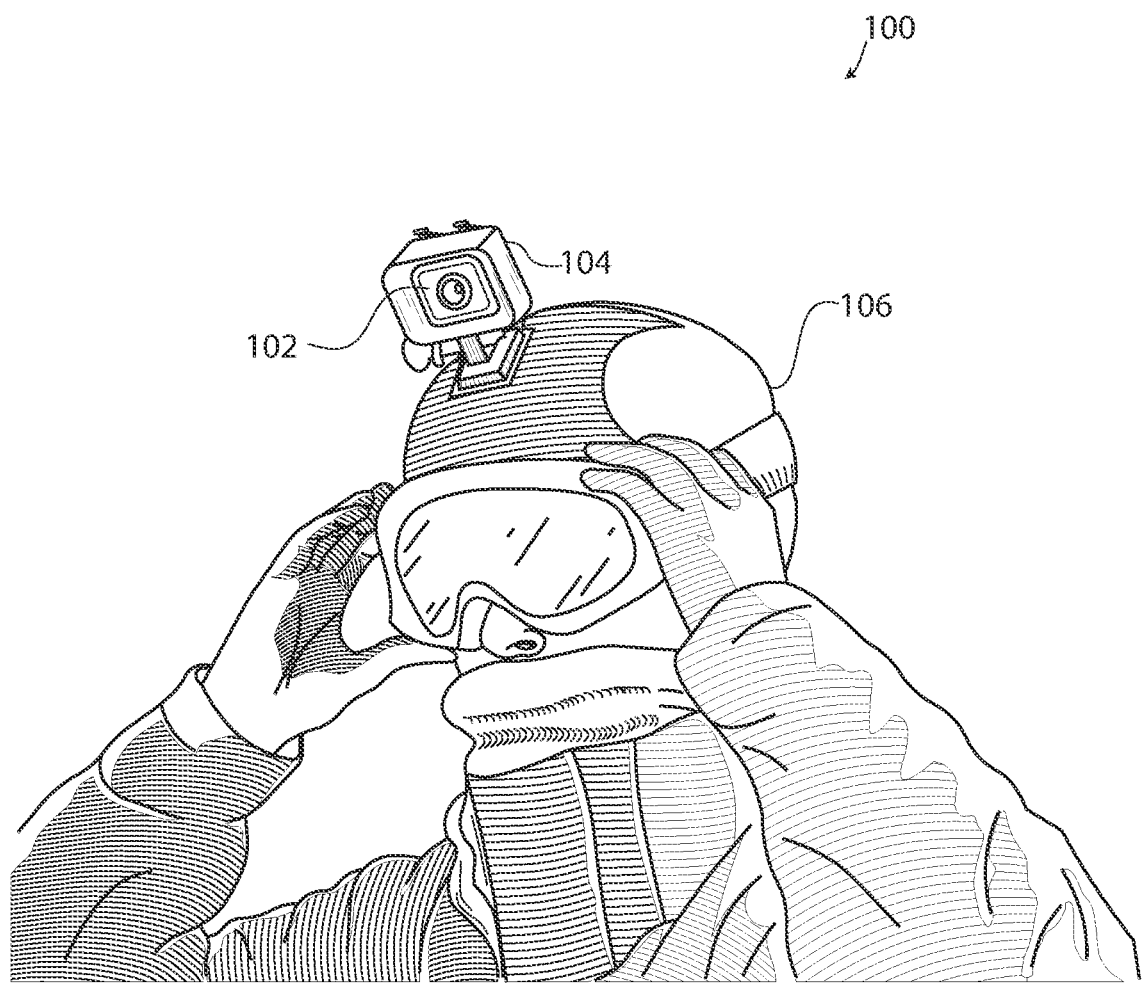
FIG. 1 illustrates a perspective view of an electronics assembly enclosed in a cold weather-resilient case and further mounted on a wearable.

Referring to FIG. 1, which illustrates a perspective view 100 of a wearable 106 on which an electronics system may be mounted. The electronics system may include an electronics assembly 102 enclosed in a cold-weather resilient case 104. Further, the electronics system may be further mounted on a wearable 106. It must be noted that the wearable 106 may include but is not limited to a shoulder pad, a vest, and the like. Alternatively, the electronics assembly 102 enclosed in a cold-weather resilient case 104 may also be mounted on handheld devices such as selfie-sticks, hand mounts, tripods, and the like.

The cold-weather resilient case 104 may be arranged in one or more configurations. The one or more configurations may include an interface-load configuration and a recording configuration. Further, the recording configuration may be different from the interface-load configuration. For example, the interface-load configuration may represent an opened state of the cold-weather resilient case 104, and the recording configuration may represent a closed state of the cold-weather resilient case 104. In the interface-load configuration, the exothermic component may be readily loaded on the cold-weather resilient case 104. Further in the recording configuration, the exothermic component may contact the user interface of the electronics assembly 102, and a video recording may be initiated thereafter. Accordingly, the user interface may not be accessible to the user. The following configurations illustrate the interface-load configuration and the recording configuration in detail.

Figure 2:
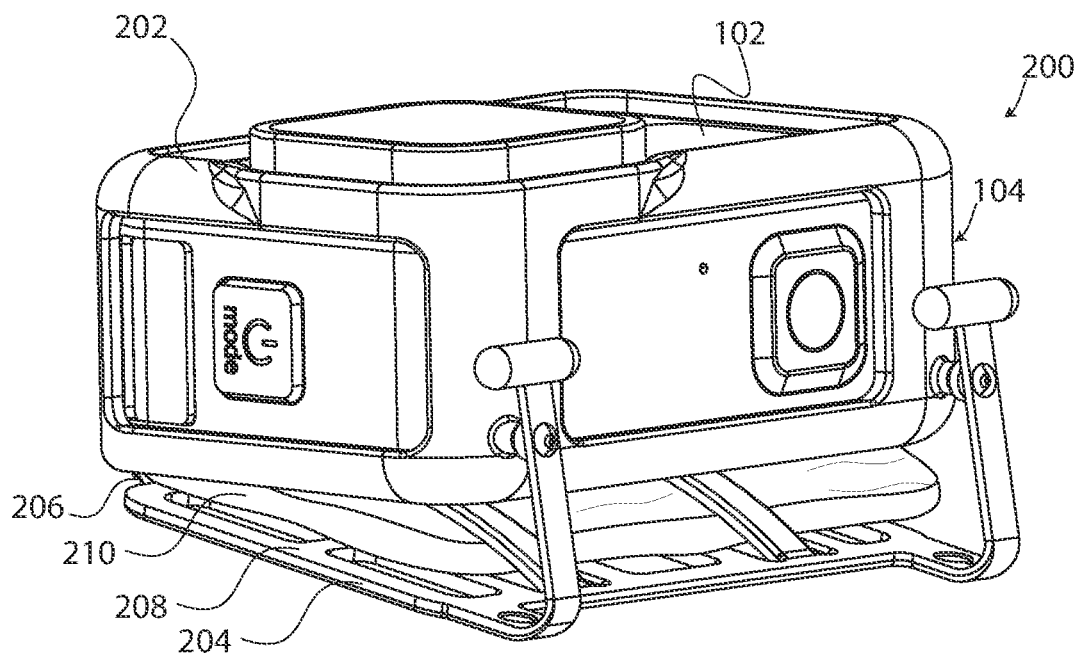
FIG. 2 illustrates a perspective view of the electronics assembly enclosed in the cold weather-resilient case in a recording configuration.
Figure 3:
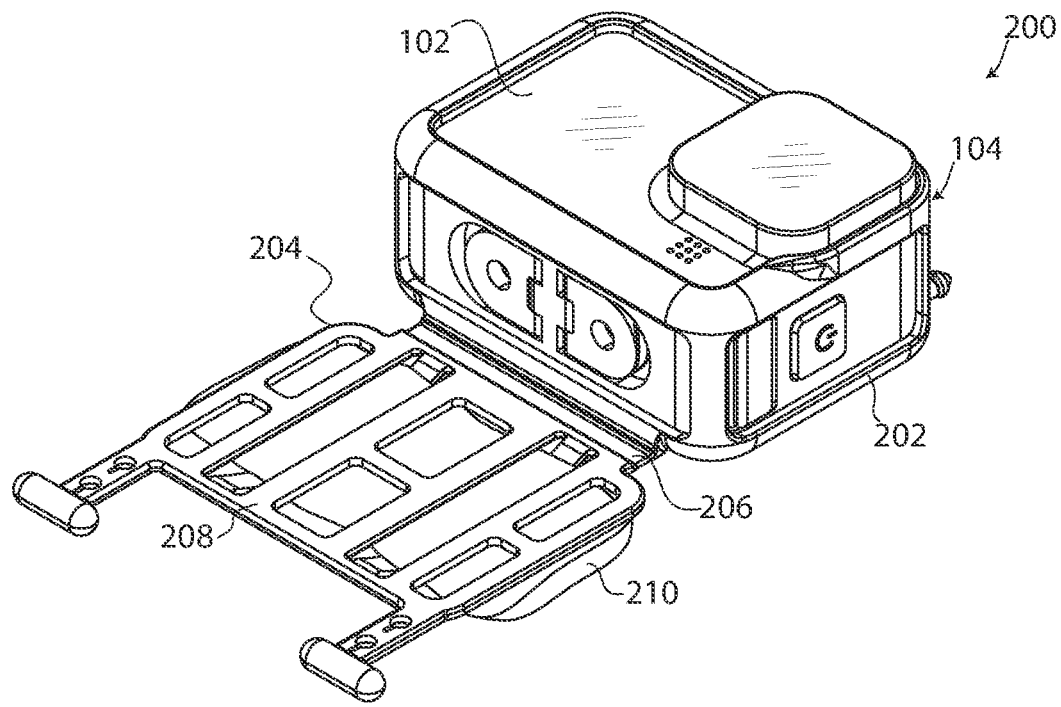
FIG. 3 illustrates a perspective view of the electronics assembly enclosed in the cold weather-resilient case in an interface-load configuration.

In an illustrative configuration, FIG. 2 illustrates a perspective view 200 of the electronics assembly 102 enclosed in the cold weather-resilient case 104 in the recording configuration. Further, FIG. 3 illustrates a perspective view 300 of the electronics assembly 102 enclosed in the cold weather-resilient case 104 in the interface-load configuration, as an illustrative configuration of the present disclosure. Further, FIG. 4 illustrates a bottom perspective view 400 of the cold weather-resilient case 104 of FIG. 3.

Figure 4:
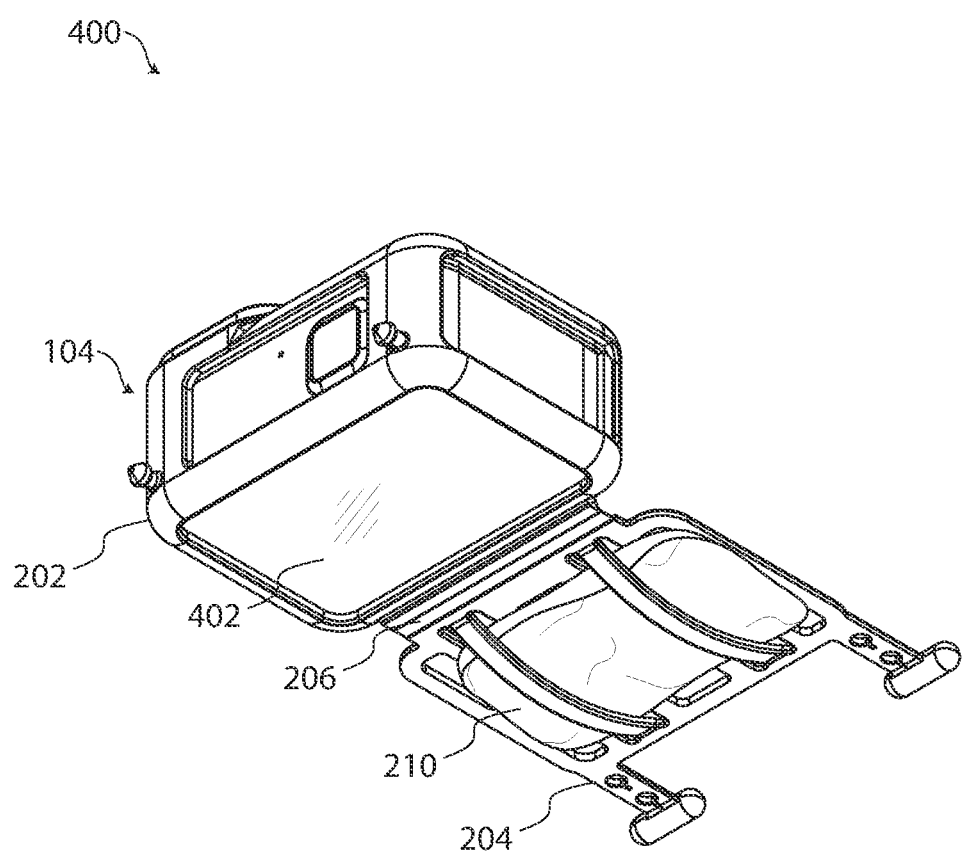
FIG. 4 illustrates a bottom perspective view of the cold weather-resilient case of FIG. 3.

In an illustrative configuration, referring to FIGS. 2-4, the cold-weather resilient case 104 may include a cover 202 and a carrier plate 204 hingedly attached to the cover 202 via a hinge connection 206. The hinge connection 206 may include but is not limited to a living hinge. Further, the carrier plate 204 may be configured to accommodate a carrier base 208. Further, the carrier plate 204 may be rotated about the hinge connection 206 in a counterclockwise direction from the interface-load configuration (illustrated by FIG. 3) to the recording configuration (illustrated by FIG. 2). This is illustrated in detail in successive configurations of the disclosure.

With continued reference to FIGS. 2-4, the cover 202 may be configured to enclose or envelop the electronics assembly 102. The cover 202 may include a frame body, which may further include one or more sections to expose various interfaces of the electronics assembly 102 to the user. The one or more sections may include a first section, a second section, a third section, and a fourth section. This is illustrated by FIGS. 7-13.

In an illustrative configuration, the carrier plate 204 as explained earlier, may be hingedly attached to cover 202. The carrier plate 204 may further include a carrier base 208. The carrier base 208 may be defined by an upper planar surface of the carrier plate 204. Further, the carrier base 208 may be configured to accommodate and hold the exothermic component 210. After accommodation, the carrier plate 204 along with the exothermic component 210 may be rotated in the counter-clockwise direction about the hinge connection 206 until the recording configuration of the cold-weather resilient case 104 is achieved (illustrated by FIG. 2). In the recording configuration, the carrier plate 204 may be positioned parallel to a user interface 402 of the electronics assembly 102, such that the exothermic component 210 may completely contact the user interface 402. Therefore, upon contact, the exothermic component 210 may be configured to heat the electronics assembly 102.

The exothermic component 210 may be configured to generate heat by utilizing an exothermic chemical reaction. The exothermic component 210 may be a sachet or a pouch which may include exothermic substances such as a mixture of iron powder, salt, activated charcoal, vermiculite, and water, with iron being the key component. When the exothermic substances are exposed to air upon opening the packaging, the iron powder therein rapidly oxidizes, reacting with the oxygen in the air. This oxidation process is exothermic thereby resulting in the generation of heat. The heat generated is gradually released and can reach temperatures of around 135-156° F. (57-69° C.), providing warmth in cold conditions. Depending on the size and type, exothermic components can typically provide warmth for several hours before the chemical reaction is exhausted. As explained earlier, the exothermic component 210 may contact the user interface 402. Therefore, the exothermic component 210 using the heat generated, may heat the electronics assembly 102 in the recording configuration.

In one configuration, the cold weather-resilient case 104 may be fabricated by manufacturing the cover 202, the carrier plate 204, and the hinge connection 206 as a single structure using any manufacturing processes known in the art, for example, injection molding. Alternatively, the cold weather-resilient case 104 may be fabricated by separately producing the cover 202, the carrier plate 204, and the hinge connection 206, which may be adjoined using any adhesion techniques commonly known in the art. In one configuration, material of manufacturing of the cold weather-resilient case 104 may include, but not limited to plastic, rubber/silicone, leather, fabric, metal, wood, hybrid materials, carbon fiber, biodegradable materials, and thermoplastic polyurethane (TPU), and the like.

Figure 5:
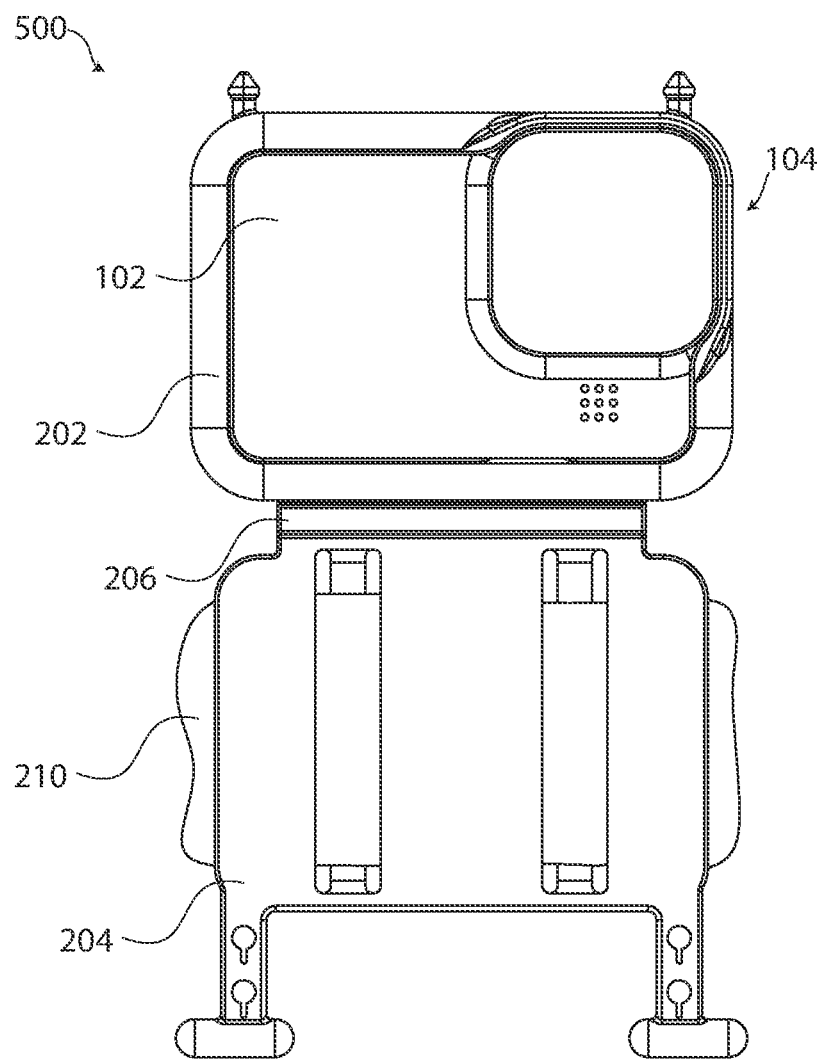
FIG. 5 illustrates a top view of the cold weather-resilient case of FIG. 3.
Figure 6:
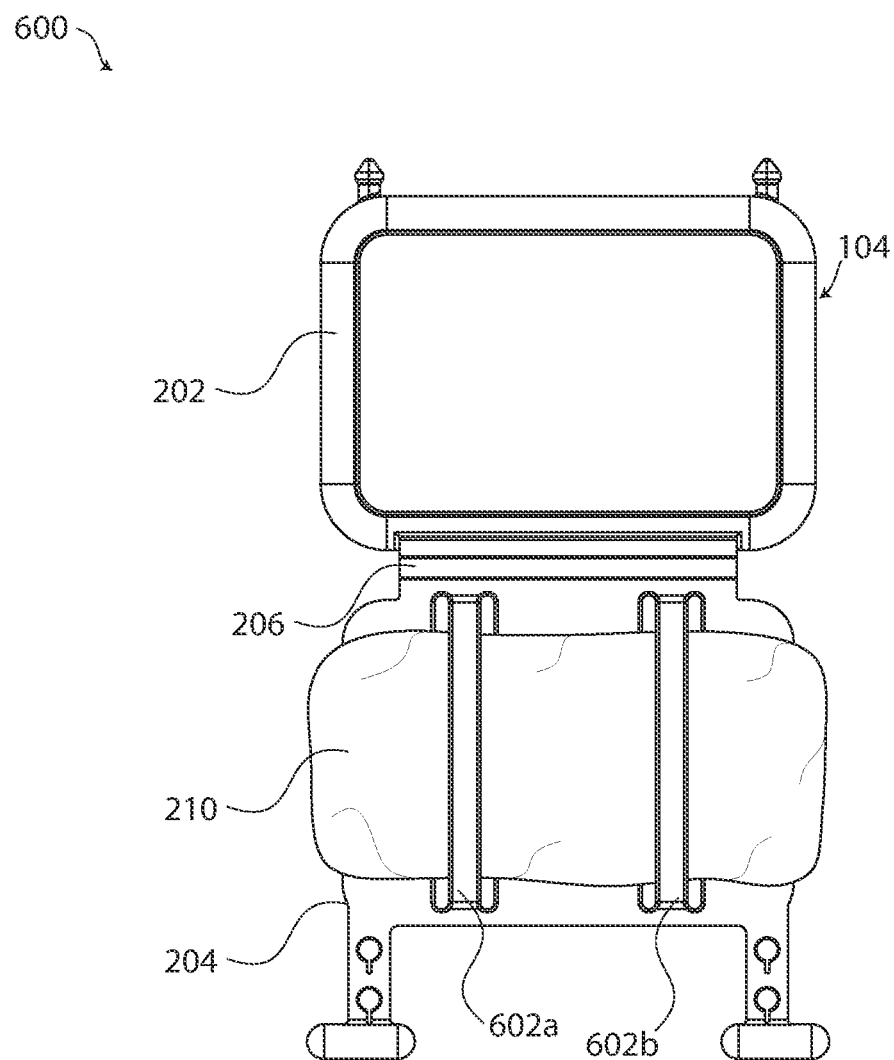
FIG. 6 illustrates a bottom view of the cold weather-resilient case of FIG. 3.

In an illustrative configuration, FIG. 5 illustrates a bottom view 500 of the cold weather-resilient case 104 of FIG. 3, and FIG. 6 illustrates a top view 600 of the cold weather-resilient case 104 of FIG. 3.

In an illustrative configuration, the carrier plate 204 may be formed as a rectangular planar structure, with dimensions similar to the cover 202. As explained earlier, the carrier base 208 being substantially planar may be configured to support the exothermic component 210. In one configuration, the exothermic component 210 may be held onto the carrier plate 204 using at least one bracket 602a, 602b (hereinafter referred to as brackets 602). The brackets 602 may be configured to confine or constrain the exothermic component 210 onto the carrier base 208, such that the exothermic component 210 may not be accidentally displaced from the carrier plate 204.

Figure 7:
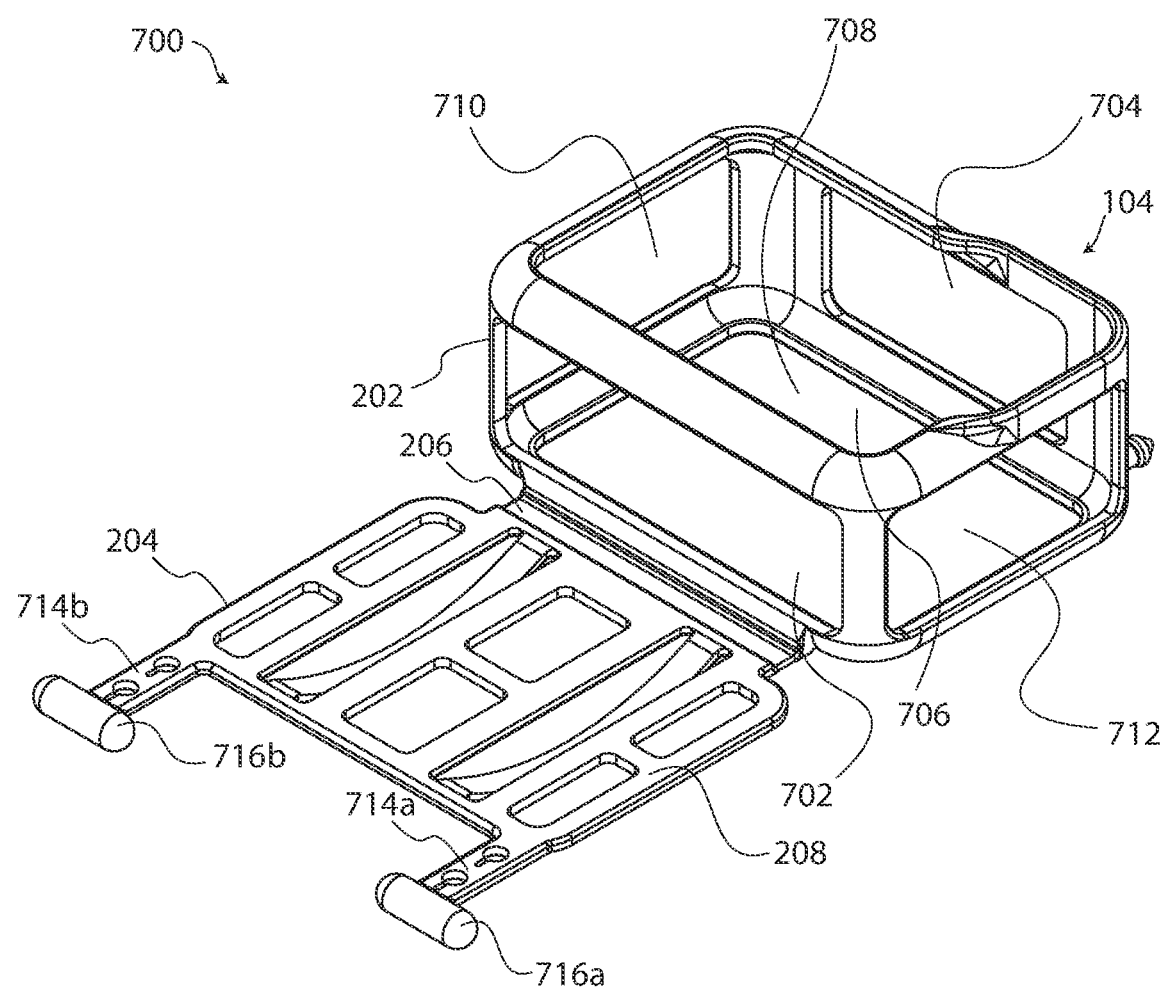
FIG. 7 illustrates a perspective view of the cold weather-resilient case.
Figure 8:
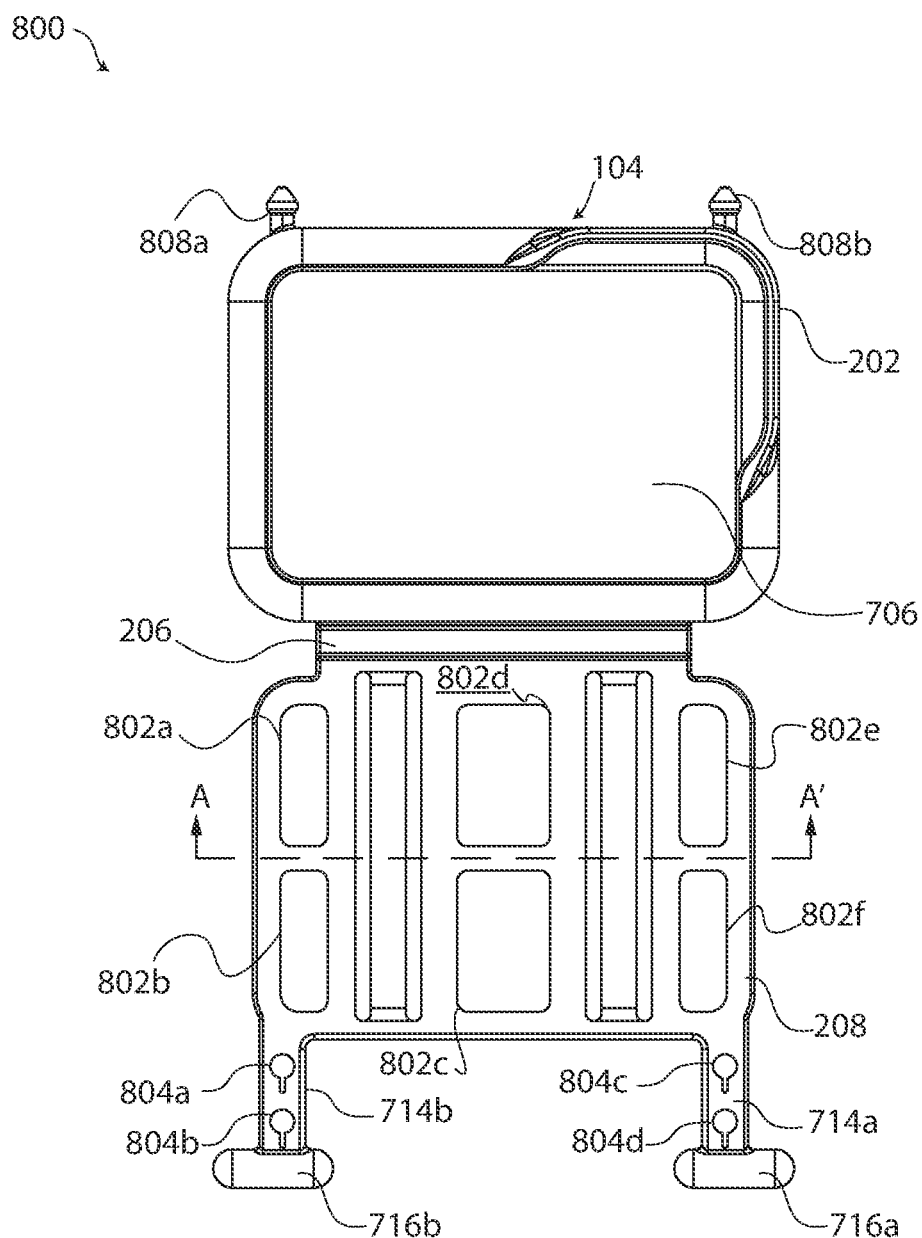
FIG. 8 illustrates a top view of the cold weather-resilient case of FIG. 7.
Figure 9:
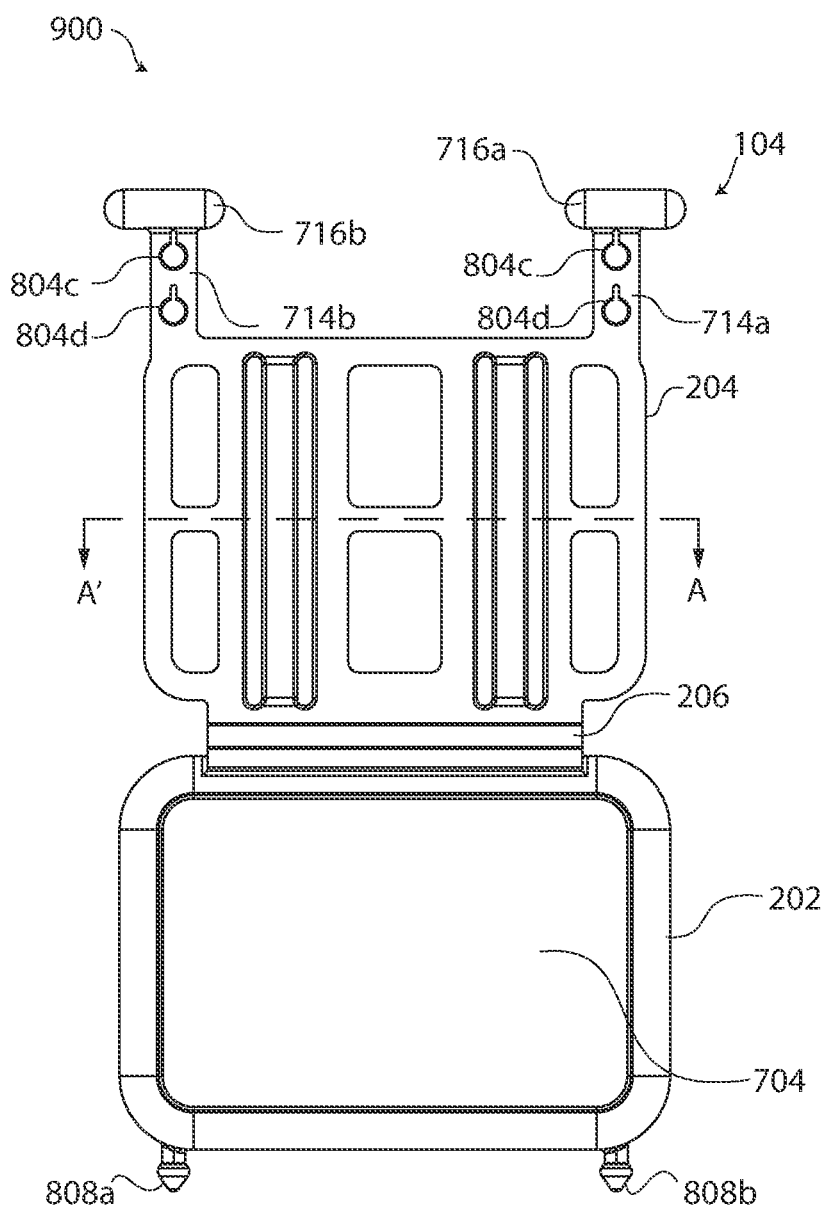
FIG. 9 illustrates a bottom view of the cold weather-resilient case of FIG. 7.
Figure 10:
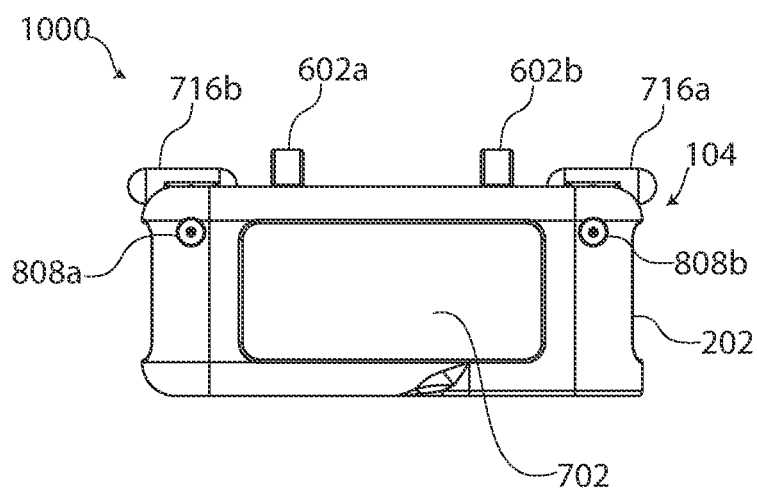
FIG. 10 illustrates a rear view of the cold weather-resilient case of FIG. 7.
Figure 11:
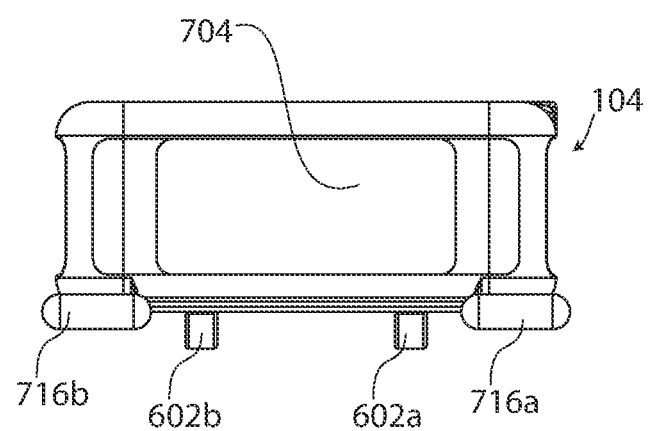
FIG. 11 illustrates a front view of the cold weather-resilient case of FIG. 7.
Figure 12:
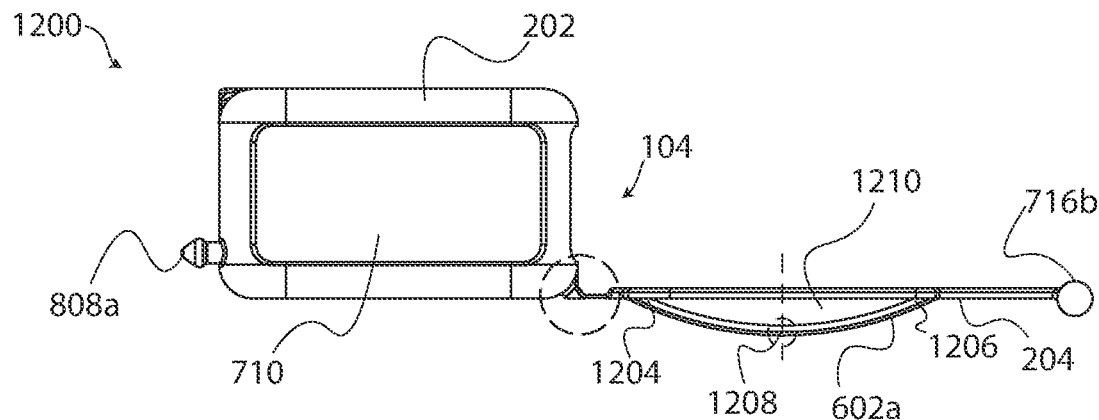
FIG. 12 illustrates a left view of the cold weather-resilient case in the interface-load configuration.
Figure 13:
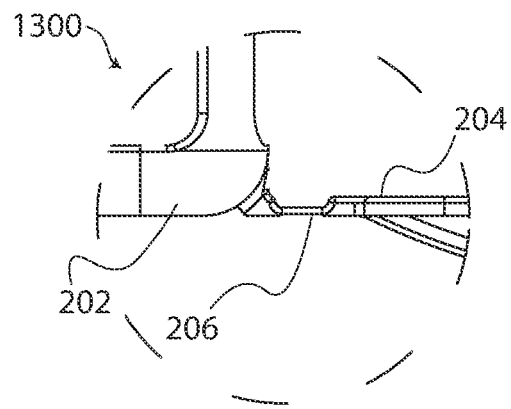
FIG. 13 illustrates a magnified view of the hinge connection.
Figure 14:
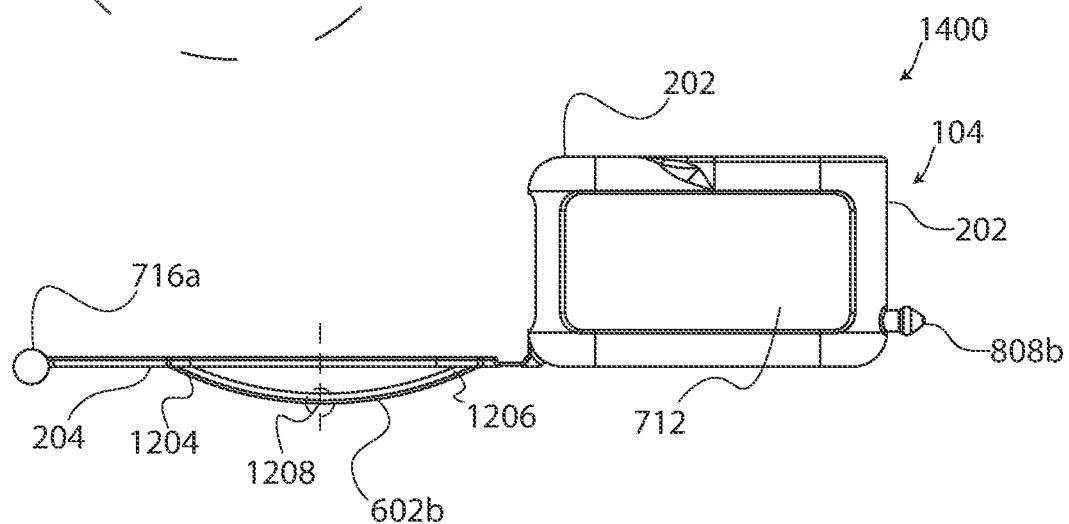
FIG. 14 illustrates a right view of the cold weather-resilient case of FIG. 7.

Now, FIG. 7 illustrates perspective view 700 of the cold weather-resilient case 104, FIG. 8 illustrates a top view 800 of the cold weather-resilient case 104 of FIG. 7, FIG. 9 illustrates a bottom view 900 of the cold weather-resilient case 104 of FIG. 7, FIG. 10 illustrates a rear view 1000 of the cold weather-resilient case 104 of FIG. 7, FIG. 11 illustrates a front view 1100 of the cold weather-resilient case 104 of FIG. 7, FIG. 12 illustrates a left view 1200 of the cold weather-resilient case 104 of FIG. 7. FIG. 13 illustrates a magnified view 1300 of the hinge connection 206. FIG. 14 illustrates a right view 1400 of the cold weather-resilient case of FIG. 7.

As explained earlier, the cold-weather resilient case 104 may include cover 202 and carrier plate 204. The cover 202 may be formed as a cuboid structure. Sharing the structural similarity with the cuboid structure, the cover 202 may include six rectangular sections separated by edges in the form of twelve linear members. For example, each corner, or corresponding vertices of each rectangular section may be adjoined using at least one linear member.

The six sections of the cover 202 may include the first section 702, the second section 704 oppositely disposed to the first section 702, the third section 706, the fourth section 708, a fifth section 710, and a sixth section 712. In one configuration, the first section 702 may be envisioned as the section adjacent to the hinge connection 206, and having a surface area perpendicular to the user interface. In an illustrative configuration, the second section 704 may be oppositely disposed to the first section 702. Further, between the first section 702 and the second section 704, a third section 706 may be disposed. Further, the third section 706, and the fourth section 708, may be disposed between the first section 702 and second section 704. Further, between the third section 706 and the fourth section 708, the fifth section 710 and a sixth section 712 opposite to the fifth section 710 may be disposed.

The six sections, as explained earlier, may be configured to expose one or more interfaces of the electronics assembly 102 to the user. In an exemplary configuration, the first section 702 may include a mounting interface. The mounting interface may be configured to allow the user to access a mounting area of the electronics assembly 102. Further, the second section 704 may include a shutter interface. The shutter interface may be configured to allow the user to access a shutter control of the electronics assembly 102. Further, the third section 706 may include a lens window, which may be configured to securely accommodate a lens of the electronics assembly 102. Further, the fourth section 708 may include the user interface 402 of the electronics assembly 102. Further, the fifth section 710, and the sixth section 712 may be configured to expose side portions of the electronics assembly 102 to the user.

In an illustrative configuration, with continued reference to FIG. 7, the cold weather-resilient case 104 may include at least one strap 714a, 714b (hereinafter referred to as straps 714) extending from the carrier plate 204. Each of the straps 714 may include a proximal end and a distal end. The proximal end of the each strap may be adjoined to the carrier plate 204, and the distal end may extend away from the carrier plate 204. In one configuration, the straps 714 may be adjoined to the carrier plate 204, or may be molded as a singular structure along with the carrier plate 204.

In an illustrative configuration, with continued reference to FIG. 7, the cold weather-resilient case 104 may include at least one grips 716a, 716b (hereinafter referred to as grips 716). Each grip may be connected to the distal ends of the straps 714. For example, the grip 716a may be connected to the distal end of the strap 714a, and the grip 716b may be connected to the distal end of the strap 714b. The grips 716 may be designed as, but not limited to, a capsule-shaped structure, or any structure which may facilitate ease of holding using a user's fingers. For example, the capsule structure illustrated by FIGS. 7-13 may enable the grips 716 to be held using a thumb and an index finger, or simply using two fingers of the user. After being held, the grips 716 may be pulled such that the straps 714 may be tensioned, or stretched accordingly, especially during the recording configuration.

In an illustrative configuration, with continued reference to FIGS. 8-14, the carrier base 208 may include a plurality of cut-out portions 802a, 802b, 802c, 802d, 802e, and 802f (hereinafter referred to as cut-out portions 802). In an illustrative configuration, the cut-out portions 802 may indicate one or more regions of the carrier base 208 being cut or removed. Further, the cut-out portions 802 may be configured to allow passage of air to the exothermic component 210. As explained earlier, the passage of air to the exothermic component 210 may be configured to induce an oxidation reaction therein, which may further heat the electronics assembly 102 accordingly when the cold weather-resilient case 104 is in the recording configuration.

In an illustrative configuration, the cut-out portions 802 may be symmetrically fabricated on the carrier base 208. For example, the cut-out portions 802a, 802d, and 802e may be fabricated against the cut-out portions 802b, 802c, and 802f about the axis AA', which passes through the lateral center of the carrier base 208. Such symmetrical arrangement may allow uniform passage of air to the exothermic component 210. Uniform passage of air to the exothermic component 210 may enable complete combustion, or a complete occurrence of the exothermic reaction in the exothermic component 210, which may result in a steady heat generation, thereby efficiently warming the electronics assembly 102.

In an illustrative configuration, the cold weather-resilient case 104 may include at least one locking slot 804a, 804b, 804c, and 804d (hereinafter referred to as locking slots 804). The locking slots 804 may include, but are not limited to, a keyhole slot. In the case of the locking slots 804 comprising the keyhole slot, the locking slots 804 may include a circular profile and a linear profile. The linear profile may extend from the circular profile, with a width less than the overall diameter of the circular profile. Further, the locking slots 804 may be linearly disposed along the straps 714, with the linear profile of each slot facing the circular profile of the adjacent slot.

In an illustrative configuration, with continued reference to FIGS. 7-14, the cold weather-resilient case 104 may include at least one headpost 808a, 808b (hereinafter referred to as headposts 808). The headposts 808 may be extended from the cover 202 corresponding to the straps 728. In an exemplary configuration, if two straps 714 extend from the cover, two headposts in line to the two straps may extend or may be formed from the cover 202, or vice versa. The headposts 808 may include a head and a rod adjoined to the head. The head may include, but is not limited to, a ball-type head, or a structure resembling the shape of a head of a mushroom, and the like.

In an illustrative configuration, in the recording configuration, the headposts 808 may be inserted and locked to the locking slots 804. Particularly, in the recording configuration, the grips 716 may be pulled to stretch the straps 714, until the desired slot from the locking slots 804 may be positioned on the headposts 808. Further, the head of the headposts 808 may be inserted into the circular profile of the locking slots 804, and the rod may be configured to slide along the linear profile to lock the headposts 808 into the locking slots 804.

The carrier plate 204 as mentioned earlier may be configured to support and hold the carrier base 208, as the brackets 602 may be configured to confine the exothermic component 210 to the carrier base 208. The brackets 602 may include curved loops which may protrude in a perpendicular direction, and offset to the carrier base 208. Alternatively, the brackets 602 may also include C-shaped brackets, or similar structures to confine the exothermic component 210 to the carrier base 208. The brackets 602 may include a first end 1204, and a second end 1206 oppositely disposed to the first end 1204. Further, the curved loop may extend between the first end 1204 and the second end 1206. In one configuration, the curved loop comprises a radial center 1208, which may be offset to the carrier base 208 of the carrier plate 204 by a predefined distance. As may be appreciated, the radial center 1208 of the curved loop being offset to the carrier base 208 may define a space 1210 between the brackets 602 and the carrier base 208. This space 1210 may be configured to allow passage of the exothermic component 210 therethrough, in the interface-load configuration.

In an illustrative configuration, as explained earlier, the carrier plate 204 may be attached to the cover 202 via the hinge connection 206. Referring to FIG. 13, as seen in the magnified view 1300, the hinge connection 206 may include a linear cross-section having a thickness less than the thickness of the carrier plate 204 and linear members of the cover 202. This cross-section may serve as a flexible joint or connection between the cover 202 and the carrier plate 204. The hinge connection 206, as a result of the linear cross-section, may possess the ability to endure multiple cycles of bending without significant degradation or failure when the carrier plate 204 may be rotated from the interface-load configuration to the recording configuration.

Figure 15:
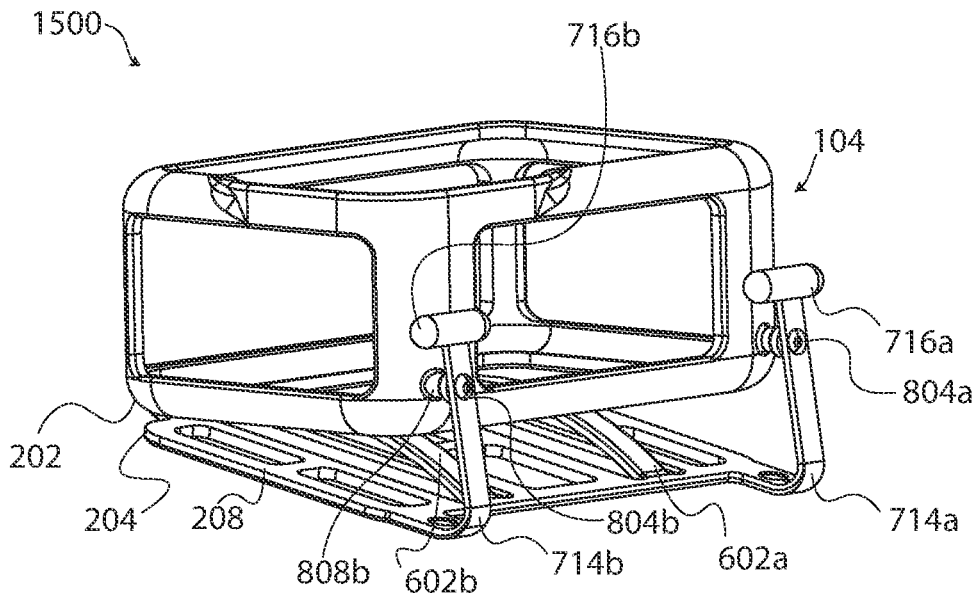
FIG. 15 illustrates a perspective view of the cold weather-resilient case in the recording configuration.
Figure 16:
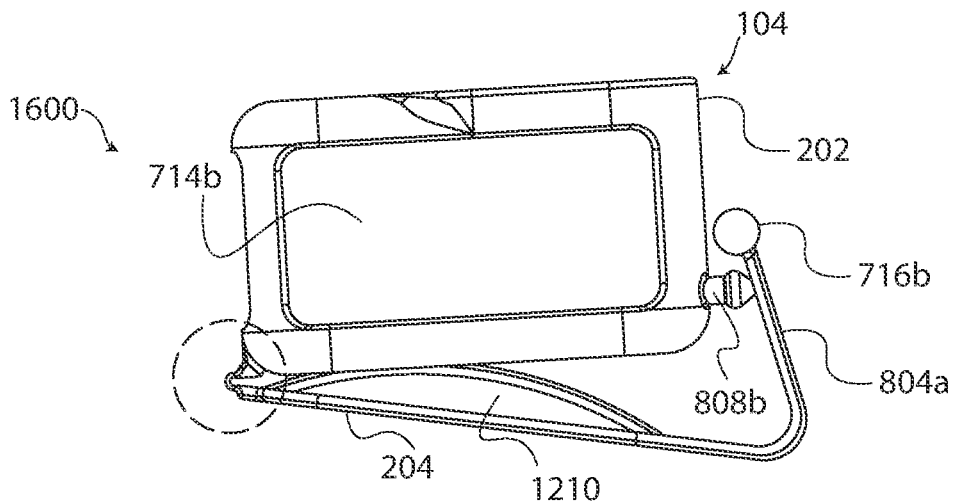
FIG. 16 which illustrates a side view of the cold weather-resilient case of FIG. 15.
Figure 17:
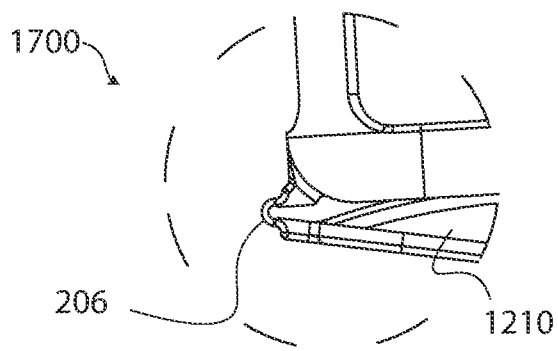
FIG. 17 which illustrates a magnified view of the hinge connection of the cold weather-resilient case of FIG. 15.

Now, referring to FIG. 15 which illustrates a perspective view 1500 of the cold weather-resilient case 104 in the recording configuration, FIG. 16 which illustrates a side view 1600 of the cold weather-resilient case 104 of FIG. 15, and FIG. 17 which illustrates a magnified view 1700 of the hinge connection 206 of the cold weather-resilient case 104 of FIG. 15.

In an illustrative configuration, as explained earlier, the cold weather-resilient case 104 may be transitioned from the interface-load configuration to the recording configuration by rotating the carrier plate 204 in a counterclockwise direction. Particularly, the carrier plate 204 may be rotated about the hinge connection 206 in the counterclockwise direction, such that the hinge connection 206 may be bent and the carrier base 208 may be parallel to the cover 202. Referring to FIG. 17, it may be seen in the magnified view 1700, that the hinge connection 206 may undergo bending when the carrier plate 204 rotated to a position almost parallel to the cover 202.

In an illustrative configuration and with continued reference to FIGS. 15-17, in the recording configuration, after the carrier base 208 may be positioned parallel to the cover 202, the straps 714 may be bent at the proximal end until the locking slots 804 may be aligned to the headposts 808. Further, in such an arrangement, the brackets 602 may contact the user interface 402 and may be compressed about the radial center 1208. Compression of the brackets 602 may reduce the space 1210.

In one configuration when the exothermic component 210 is accommodated within the space 1210, and reduction of the space 1210 in case the brackets 602 may be compressed, the exothermic component 210 may protrude out of the carrier base 208 while being restricted by the brackets 602. Therefore, a maximum portion of the exothermic component 210 may directly contact the user interface 402, and hence the electronics assembly 102 may be heated effectively.

Figure 18:
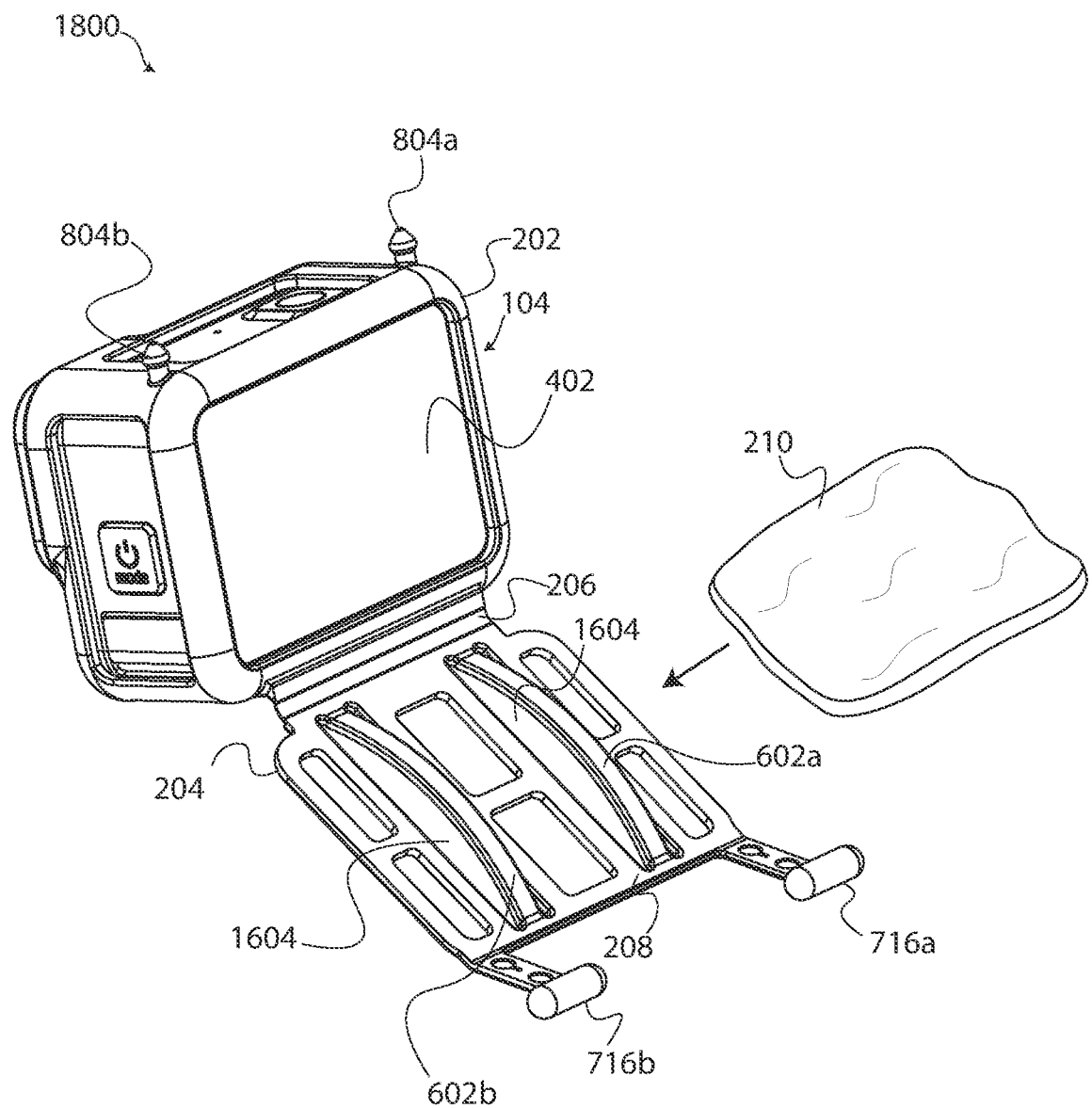
FIG. 18 illustrates a perspective view of a loading methodology for the exothermic component 210 onto the cold weather-resilient case.

In an illustrative configuration, FIG. 18 illustrates a perspective view 1800 of a loading methodology of the exothermic component 210 onto the cold weather-resilient case 104. Further, FIG. 19 illustrates a perspective view 1900 of the transitioning methodology of the cold weather-resilient case 104 from the interface-load configuration to the recording configuration.

In an illustrative configuration, with continued reference to FIG. 18, initially, the electronics assembly 102 may be accommodated within the cover 202 when the cold weather-resilient case 104 in the interface-load configuration. Further, the exothermic component 210 may be slidingly inserted into the space 1210 as indicated by the indicia. After insertion, the brackets 602 may be configured to bind or constrain the exothermic component 210 to the carrier base 208 such that the exothermic component 210 may not be in a free-to-move state on the carrier base 208, irrespective of the movement of the carrier plate 204. Further, after the exothermic component 210 may be inserted within the space 1210, the cold weather-resilient case 104 may be transitioned to the recording configuration.

Figure 19:
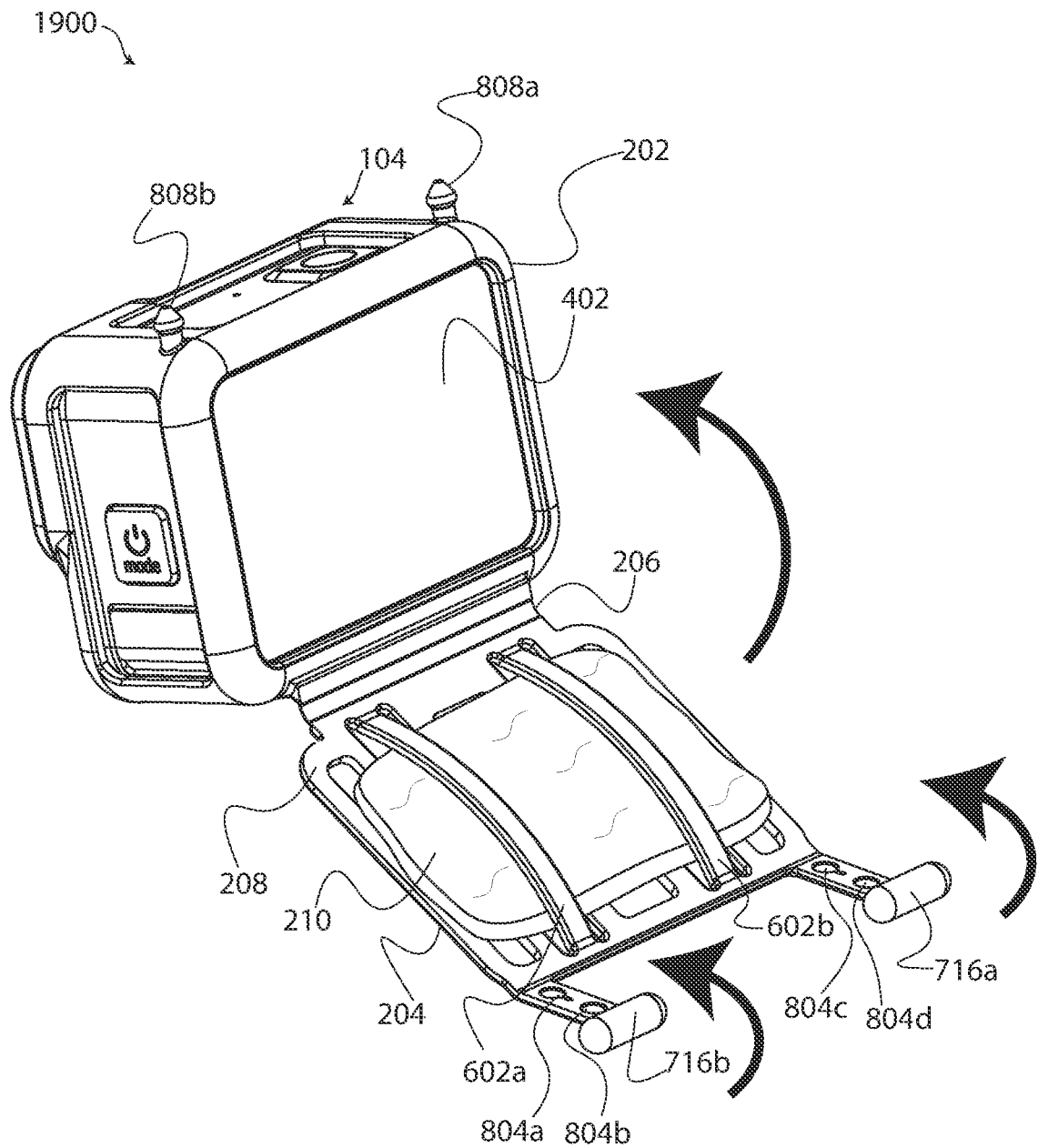
FIG. 19 illustrates a perspective view of the transitioning methodology of the cold weather-resilient case from the interface-load configuration to the recording configuration.

In an illustrative configuration, with continued reference to FIG. 19, when the exothermic component 210 may be inserted within the space 1210, the cold weather-resilient case 104 may be transitioned to the recording configuration. As explained earlier, to achieve the recording configuration, the carrier plate 204 may be rotated in the counterclockwise direction (also illustrated by an indicia proximate to the carrier plate 204 in FIG. 19). Therefore, after rotation, the carrier plate 204 may be positioned parallel to the user interface 402 such that the exothermic component 210 contacts the user interface 402. Further, to lock the carrier plate 204 in such an arrangement, the grips 716 may also be rotated in the counterclockwise direction (indicated by indicia proximate to the grips 716) such that the locking slots 804 may engage the headposts 808, and therefore, the grips 716 may be fastened to the headposts 808. After locking, the cold weather-resilient case 104 may attain the recording configuration, which is illustrated by FIG. 2

Figure 20:
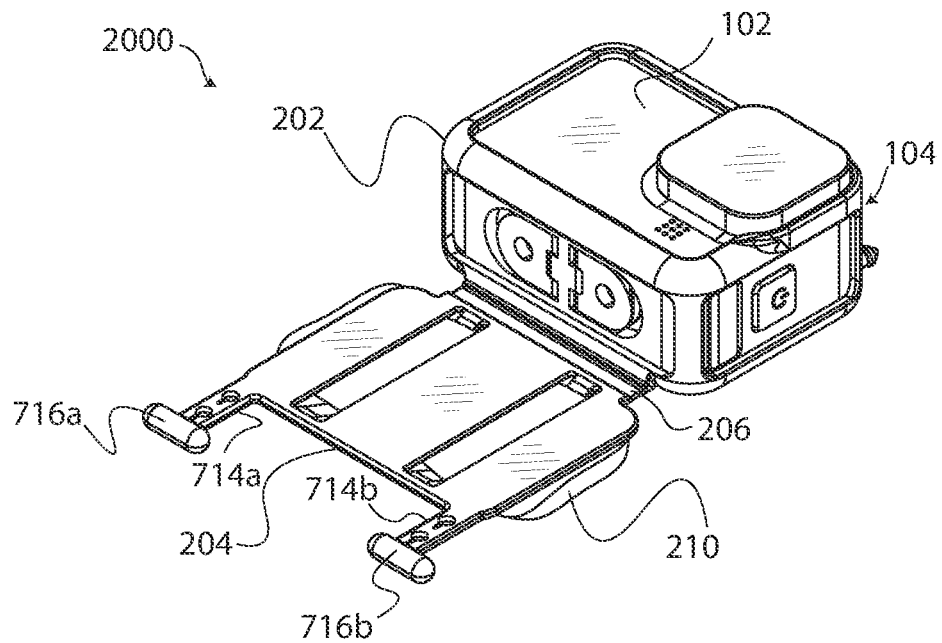
FIG. 20 illustrates a perspective view of another cold weather-resilient case with electronics assembly and exothermic component loaded thereon, in the interface load configuration.
Figure 21:
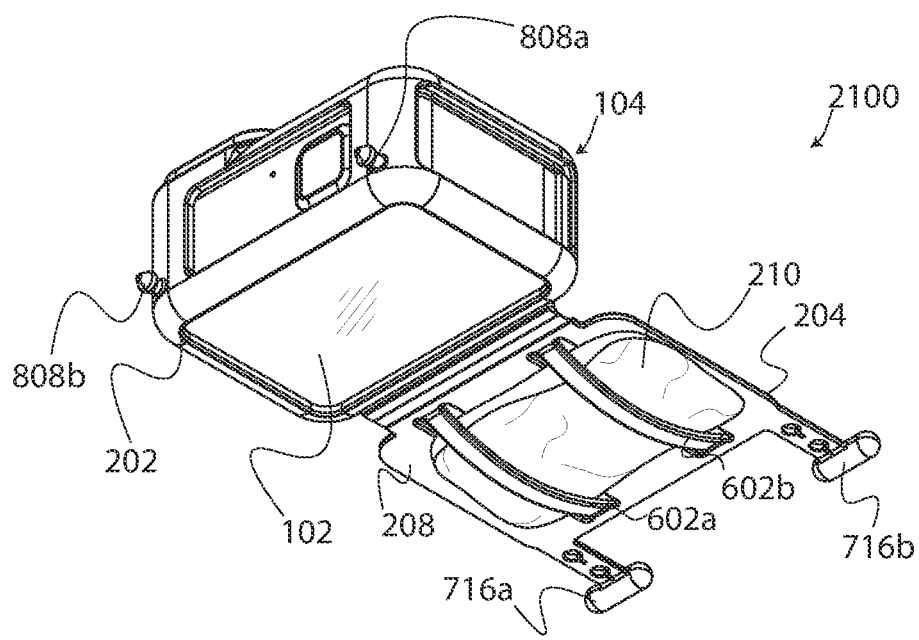
FIG. 21 illustrates a bottom perspective view of the cold weather-resilient case with electronics assembly and exothermic component loaded thereon, in the interface load configuration.
Figure 22:
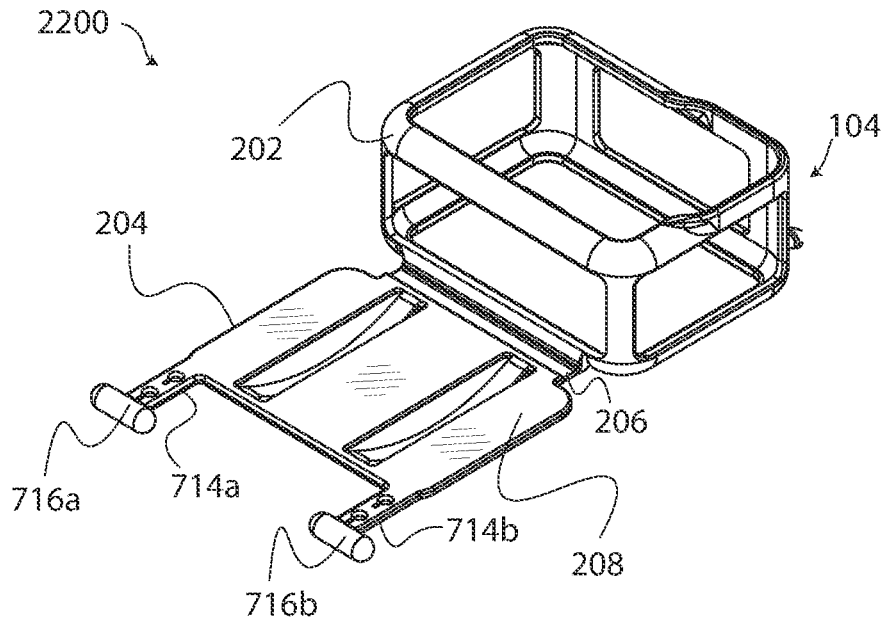
FIG. 22 illustrates a perspective view of the cold weather-resilient case of FIG. 21.
Figure 23:
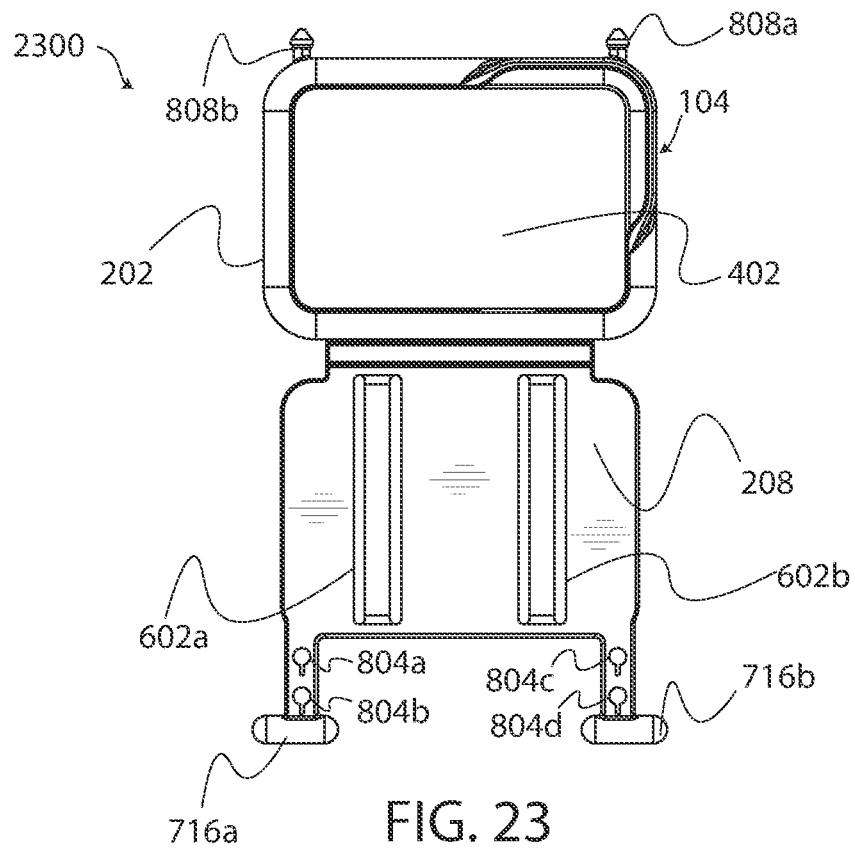
FIG. 23 illustrates a bottom view of the cold weather-resilient case of FIG. 21.
Figure 24:
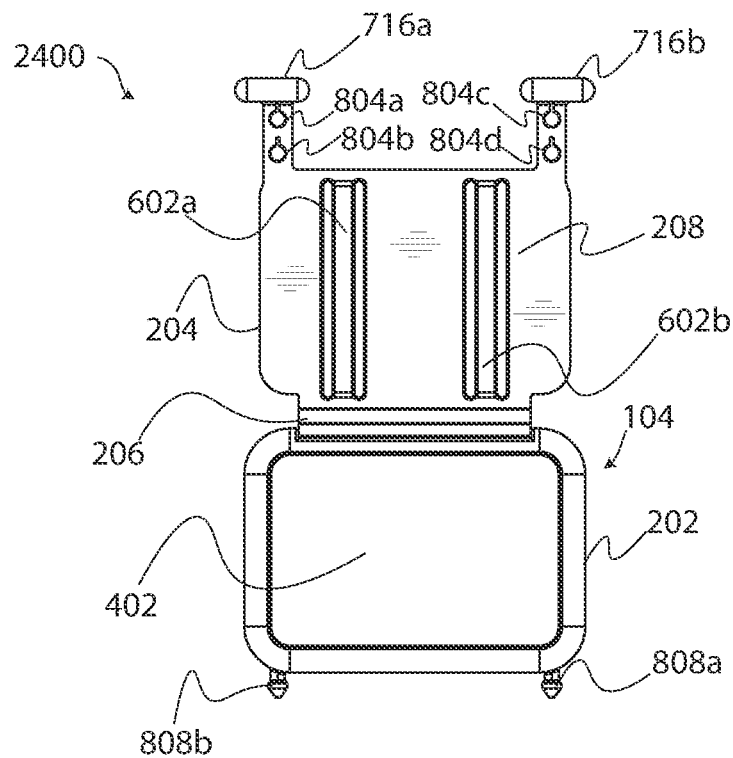
FIG. 24 illustrates a top view of the cold weather-resilient case of FIG. 21.

In an alternative configuration, FIG. 20 illustrates a perspective view 2000 of another cold weather-resilient case 104 with electronics assembly 102 and exothermic component 210 loaded thereon, in the interface load configuration. FIG. 21 illustrates a bottom perspective view 2100 of the cold weather-resilient case 104 with electronics assembly 102 and exothermic component 210 loaded thereon, in the interface load configuration. FIG. 22 illustrates a perspective view 2200 of the cold weather-resilient case 104 of FIG. 21. FIG. 23 illustrates a bottom view 2300 of the cold weather-resilient case 104 of FIG. 21. FIG. 24 illustrates a top view 2400 of the cold weather-resilient case 104 of FIG. 21.

In an alternative configuration, referring to FIGS. 20-23 the carrier plate 204 of the electronics assembly 102 may include a plate. In this configuration, instead of the cut-out portions 802 (refer to FIG. 8) formed on the carrier base 208, the carrier base 208 may include a continuous planar structure. To allow passage of air to the exothermic component 210 rested on the carrier base 208, the gaps below the brackets 602 may be widened accordingly. Such configurations allow limited passage of air to the exothermic component 210, and hence, low, and steady heat may be generated from the exothermic component 210. As a result, the electronics assembly 102 may be heated for a longer time period.

In an alternative configuration, the cover 202 may include an omniphobic transparent sheet (not depicted in the figure) affixed to at least one section. The omniphobic transparent sheet may include a transparent material or film characterized by omniphobic properties thereof, denoting a capacity to repel a diverse array of liquids, including oils, water, and other substances, thereby imparting significant resistance to wetting or staining. The omniphobic transparent sheet may adhere to at least one interface of the electronics assembly 102 when positioned within the cover 202. This attachment of the omniphobic sheet may serve to prevent condensation on the interfaces of the electronics assembly 102, thereby mitigating the impact of temperature differentials between the surroundings and the interfaces in contact with the exothermic component 210. This configuration enhances the overall performance and reliability of the electronics assembly by averting potential condensation-related issues.

In an alternative configuration, the strap 714 may include at least one first-type coupler, and the cover 202 may include at least one second-type coupler. Each of the at least one first-type coupler may include a first magnet with a first polarity side and a second polarity side. Additionally, the second-type coupler may include an iron section or a second magnet. In the case of the second magnet, the second magnet may include a first polarity side attracted to the second polarity side of the first magnet and a second polarity side attracted to the first polarity side of the first magnet. In the recording configuration, the first magnet in the grips 716 may be attracted and attached to the second magnet or the iron section of the cover 202 using magnetic characteristics of the first magnet and the second magnet or the iron section, and hence, the carrier plate 204 may be locked to the cover 202 accordingly.

Figure 25:
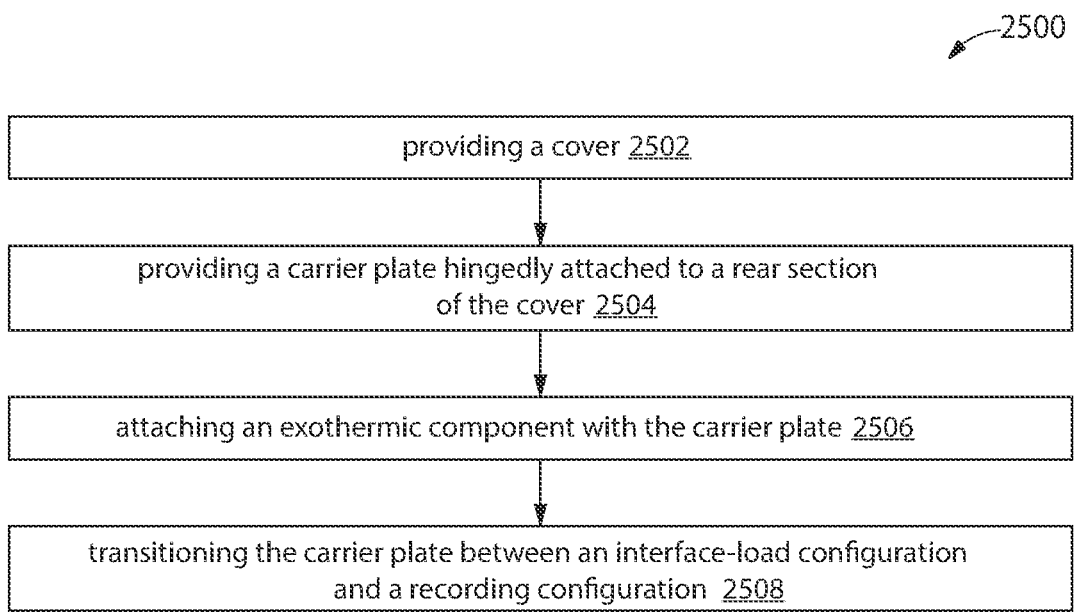
FIG. 25 illustrates a flowchart of a heating method for heating an electronics assembly including a user interface in a cold-weather resilience case.

Now, FIG. 25 illustrates a flowchart 2500 of a heating method for heating an electronics assembly including a user interface in a cold-weather resilience case. At step 2502, a cover 202 may be provided. The cover 202 may include a frame body, which may further include one or more sections to expose various interfaces of the electronics assembly 102 to the user. The one or more sections may include a first section, a second section, a third section, and a fourth section. This is illustrated by FIGS. 7-13.

At step 2504, a carrier plate 204 may be provided. The carrier plate 204 may be hingedly attached to cover 202. The carrier plate 204 may further include a carrier base 208. The carrier base 208 may be defined by an upper planar surface of the carrier plate 204. At step 2506, an exothermic component 210 may be attached to the carrier plate 204. Particularly, the carrier base 208 may be configured to accommodate and hold the exothermic component 210. Further, the exothermic component 210 may be held onto the carrier plate 204 using at least one bracket 602a, 602b (hereinafter referred to as brackets 602). The brackets 602 may be configured to confine or constrain the exothermic component 210 onto the carrier base 208, such that the carrier base 208 may not accidentally displaced from the carrier plate 204.

At step 2508, the carrier plate may be transitioned between an interface-load configuration and a recording configuration. In the interface-load condition, the user interface 402 of the electronics assembly may be accessible to the user, and the exothermic component 210 may be readily loadable to the carrier plate 204. Further, in the recording configuration, the carrier plate 204 may be positioned parallel to a user interface 402 of the electronics assembly 102, such that the carrier base 208 may completely contact the user interface 402. Therefore, upon contact, the carrier base 208 may be configured to heat the electronics assembly 102.

As used herein, including in the claims, "and" as used in a list of items prefaced by "at least one of" or "at least one of" indicates that any combination of the listed items may be used. For example, a list of "at least one of A, B, and C" includes any of the combinations A or B or C or AB or AC or BC and/or ABC (i.e., A and B and C). Furthermore, to the extent that more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods and/or machine-readable media have been described in detail herein, it is to be understood that the inventive concepts may be otherwise variously embodied and employed and that the appended claims are intended to be construed to include such variations except as limited by the prior art. While the principles of the disclosure have been described above in connection with specific apparatuses and methods, it is to be clearly understood that this description is made only by way of example and not as limitation on the scope of the disclosure.

What is claimed is:

1. A cold-weather resilience case for an electronics assembly comprising a user interface, the cold-weather resilience case comprising:
   a cover configured to envelop the electronics assembly, the cover comprising:
      a frame body comprising:
         a first section;
         a second section oppositely disposed to the first section;
         a third section disposed between the first section and the second section; and
         a fourth section oppositely disposed to the third section;
   a carrier plate hingedly attached to the fourth section, the carrier plate comprising:
      a carrier base configured to hold an exothermic component;
   an interface-load configuration, wherein:
      the user interface of the electronics assembly is accessible; and
      the exothermic component is readily loadable to the carrier plate; and
   a recording configuration different than the interface-load configuration, wherein:
      the exothermic component is in contact with the electronics assembly at the fourth section and configured to heat the electronics assembly.

2. The cold-weather resilience case of claim 1, wherein the electronics assembly comprises:
   an image capturing device.

3. The cold-weather resilience case of claim 1 and further comprising:
   at least one linear member configured to adjoin each corresponding vertices of the fourth section and the third section.

4. The cold-weather resilience case of claim 1 and further comprising:
   a sixth section disposed between the second section, the first section, the third section and the fourth section; and
   a fifth section oppositely disposed to the sixth section.

5. The cold-weather resilience case of claim 1, wherein the carrier plate further comprises:
   at least one cut-out portion to allow passage of air to the exothermic component.

6. The cold-weather resilience case of claim 5, wherein the carrier plate further comprises:
   at least one bracket protruding from and offset to the carrier plate by a predefined distance, wherein each of the at least one bracket comprises:
      a first end affixed to the carrier plate;
      a second end oppositely disposed to the first end and affixed to the carrier plate; and
      a curved loop extending from the first end to the second end, wherein the curved loop comprises:
         a radial center offset to the carrier plate by a predefined distance to form a space to hold the exothermic component on the carrier plate.

7. The cold-weather resilience case of claim 6 and further comprising:
   at least one strap extending from the carrier plate, each of the at least one strap comprising:
      a proximal end attached to the carrier plate;
      a distal end oppositely disposed to the proximal end; and
      an array of locking slots arranged linearly between the proximal end and the distal end.

8. The cold-weather resilience case of claim 7 and further comprising:
   at least one headpost extending from the cover and corresponding to the at least one strap,
   wherein the at least one headpost engages the array of locking slots to lock the carrier plate with the cover in the recording configuration.

9. The cold-weather resilience case of claim 8, wherein the at least one strap further comprises:
   a grip adjoined to the distal end, wherein the grip is pulled to tension the at least one strap until the at least one headpost engages a desired slot from the array of locking slots.

10. A heating method for heating an electronics assembly comprising a user interface in a cold-weather resilience case, the heating method comprising:
    providing a cover comprising:
       a frame body comprising:
          a first section;
          a second section oppositely disposed to the first section;
          a third section disposed between the first section and the second section; and
          a fourth section oppositely disposed to the third section;
    providing a carrier plate hingedly attached to the fourth section, the carrier plate comprising:
       a carrier base; and
       at least one bracket;
    attaching an exothermic component with the carrier plate; and
    transitioning the carrier plate between:
       an interface-load configuration, wherein:
          the user interface of the electronics assembly is accessible; and
          the exothermic component is readily loadable to the carrier plate; and
       a recording configuration that is different than the interface-load configuration, wherein the exothermic component is contacted to the electronics assembly at the fourth section, wherein:
          the exothermic component is configured to heat the electronics assembly.

11. The heating method of claim 10, wherein providing a cover for enveloping the electronics assembly within the cover further comprises:
    the electronics assembly comprising:
       an image capturing device.

12. The heating method of claim 10 and further comprising:
    providing at least one linear member for adjoining each of corresponding vertices of the fourth section and the third section.

13. The heating method of claim 10, and further comprising:

providing a sixth section disposed between the second section, the first section, the third section, and the fourth section; and providing a fifth section oppositely disposed to the sixth section.

14. The heating method of claim 10, wherein providing the carrier plate further comprises:

providing at least one cut-out portion for allowing passage of air to the exothermic component.

15. The heating method of claim 14, wherein providing the carrier plate further comprises:

providing the at least one bracket protruding from and offset to the carrier plate by a predefined distance, each bracket comprising:
providing a first end, wherein the first end is affixed to the carrier plate;
providing a second end oppositely disposed to the first end and affixed to the carrier plate; and
providing a curved loop extending from the first end to the second end, wherein the curved loop comprises:
a radial center offset to the carrier plate by a predefined distance to form a space for holding the exothermic component.

16. The heating method of claim 15, wherein providing the carrier plate further comprises:

providing at least one strap extending from the carrier plate, each of the at least one strap comprising:
a proximal end attached to the carrier plate;
a distal end oppositely disposed to the proximal end; and
an array of locking slots arranged linearly between the proximal end and the distal end.

17. The heating method of claim 16 and further comprising:

providing at least one headpost extending from the cover and corresponding to the at least one strap; and
locking the carrier plate with the cover in the recording configuration by engaging at least one headpost to the array of locking slots.

18. The heating method of claim 17 and further comprising:

providing a grip adjoined to the distal end; and
pulling the grip for tensioning the at least one strap until the at least one headpost engages a desired slot from the array of locking slots.

19. An electronics system, comprising:
an electronics assembly comprising a user interface;
a cover configured to envelop the electronics assembly, the cover comprising:
a frame body comprising:
a first section;
a second section oppositely disposed to the first section;
a third section disposed between the first section and the second section; and
a fourth section oppositely disposed to the third section;
a carrier plate hingedly attached to the fourth section, the carrier plate comprising:
a carrier base configured to hold an exothermic component;
an interface-load configuration, wherein:
the user interface of the electronics assembly is accessible; and
the exothermic component is readily loadable to the carrier plate; and
a recording configuration different than the interface-load configuration, wherein:
the exothermic component is in contact with the electronics assembly at the fourth section and configured to heat the electronics assembly.

20. The electronics system of claim 19, wherein the carrier plate further comprises:
at least one cut-out portion to allow passage of air to the exothermic component.

21. The electronics system of claim 19, wherein the carrier plate comprises:
at least one bracket protruding from and offset to the carrier base by a predefined distance, wherein each of the at least one bracket comprises:
a first end affixed to the carrier plate;
a second end oppositely disposed to the first end and affixed to the carrier plate; and
a curved loop extending from the first end to the second end, wherein the curved loop comprises:
a radial center offset to the carrier plate by a predefined distance to form a space to hold the exothermic component.

22. The electronics system of claim 19 and further comprising:
at least one strap extending from the carrier plate, each of the at least one strap comprising:
a proximal end attached to the carrier plate;
a distal end oppositely disposed to the proximal end; and
an array of locking slots arranged linearly between the proximal end and the distal end.

23. The electronics system of claim 22 and further comprising:
at least one headpost extending from the cover and corresponding to the at least one strap,
wherein the at least one headpost engages the array of locking slots to lock the carrier plate with the cover in the recording configuration.

24. A cold-weather resilience case for an electronics assembly comprising a user interface, the cold-weather resilience case comprising:
a cover configured to envelop the electronics assembly, the cover comprising:
a frame body comprising:
a first section;
a second section oppositely disposed to the first section;
a third section disposed between the first section and the second section; and
a fourth section oppositely disposed to the third section;
a carrier plate hingedly attached to the fourth section, the carrier plate comprising:
a carrier base; and
at least one bracket configured to hold an exothermic component;
an interface-load configuration, wherein:
the user interface of the electronics assembly accessible; and
the exothermic component is readily loadable to the carrier plate; and
a recording configuration different than the interface-load configuration, wherein:
the exothermic component is in contact with the electronics assembly at the fourth section and configured to heat the electronics assembly.

25. The cold-weather resilience case of claim 24, and further comprising:
- an omniphobic sheet disposed on the frame body and configured to attach to the electronics assembly; and
- at least one first-type coupler disposed on the second section of the frame body.

26. The cold-weather resilience case of claim 25 and further comprising:
- at least one strap extending from the carrier base corresponding to the at least one first-type coupler, the at least one strap comprising:
- at least one second-type coupler configured to engage the at least one first-type coupler in the recording configuration.

27. The cold-weather resilience case as claimed in claim 26, wherein:
- each of the at least one first-type coupler comprises:
  - a first magnet comprising:
    - a first polarity side; and
    - a second polarity side; and
- each of the at least one second-type coupler comprising:
  - an iron section, or
  - a second magnet comprising:
    - a first polarity side attracted to the second polarity side of the first magnet; and
    - a second polarity side attracted to the first polarity side of the first magnet.

* * * * *